Figure 1:
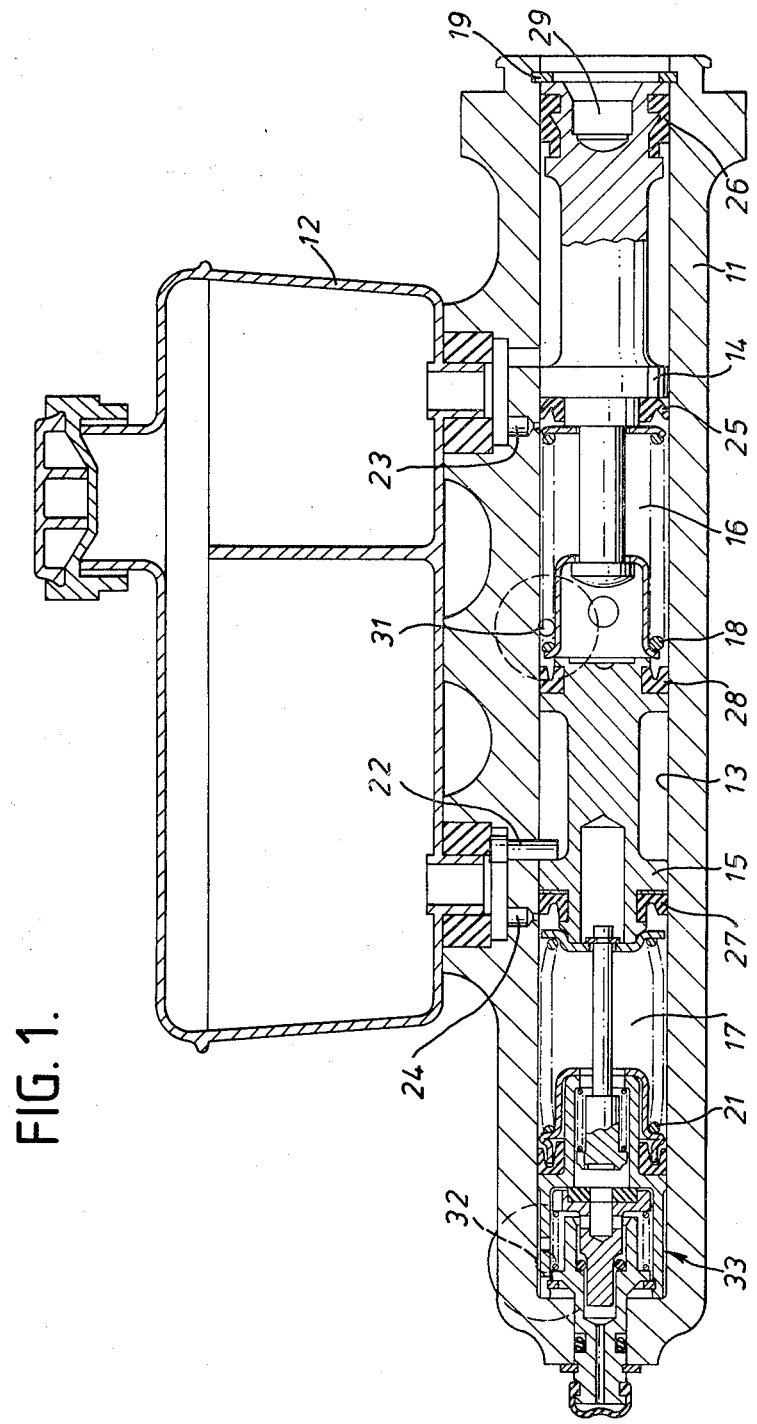

United States Patent [19]

Higgerson et al.

[11] 4,229,940
[45] Oct. 28, 1980

[54] HYDRAULIC MASTER CYLINDER

[75] Inventors: Raymond Higgerson, Bishops Itchington; David Parsons, Kenilworth, both of England

[73] Assignee: Automotive Products Limited, Leamington Spa, England

[21] Appl. No.: 935,771

[22] Filed: Aug. 22, 1978

[30] Foreign Application Priority Data

Sep. 7, 1977 [GB] United Kingdom ............... 37270/77

[51] Int. Cl.³ .............................................. B60T 11/20
[52] U.S. Cl. ...................................... 60/562; 60/574; 60/591; 303/6 C
[58] Field of Search ................. 60/562, 574, 581, 591, 60/589; 303/6 C

[56] References Cited

U.S. PATENT DOCUMENTS

| | | | |
|---|---|---|---|
| 2,277,292 | 3/1942 | Bowen | 60/578 |
| 3,659,421 | 5/1972 | Wilson | 60/562 |
| 3,662,552 | 5/1972 | Ochiai | 60/562 |
| 3,677,606 | 7/1972 | Shutt | 60/562 |
| 4,078,384 | 3/1978 | Shutt | 60/562 |
| 4,154,260 | 5/1979 | Shutt | 60/591 |

*Primary Examiner*—Abraham Hershkovitz
*Attorney, Agent, or Firm*—Kemon & Estabrook

[57] ABSTRACT

A twin-piston (e.g. tandem) master cylinder is provided for a split braking system having disc brakes on some wheels of a vehicle and drum brakes on others. A delay valve is incorporated in the master cylinder for the supply to the disc brakes, the delay valve having a valve member controlled by one of the master cylinder pistons to initially shut-off the supply of fluid to the disc brakes after the piston has moved a short distance. A plunger moves against a control spring to re-open the supply to the disc brakes above a predetermined pressure.

8 Claims, 2 Drawing Figures

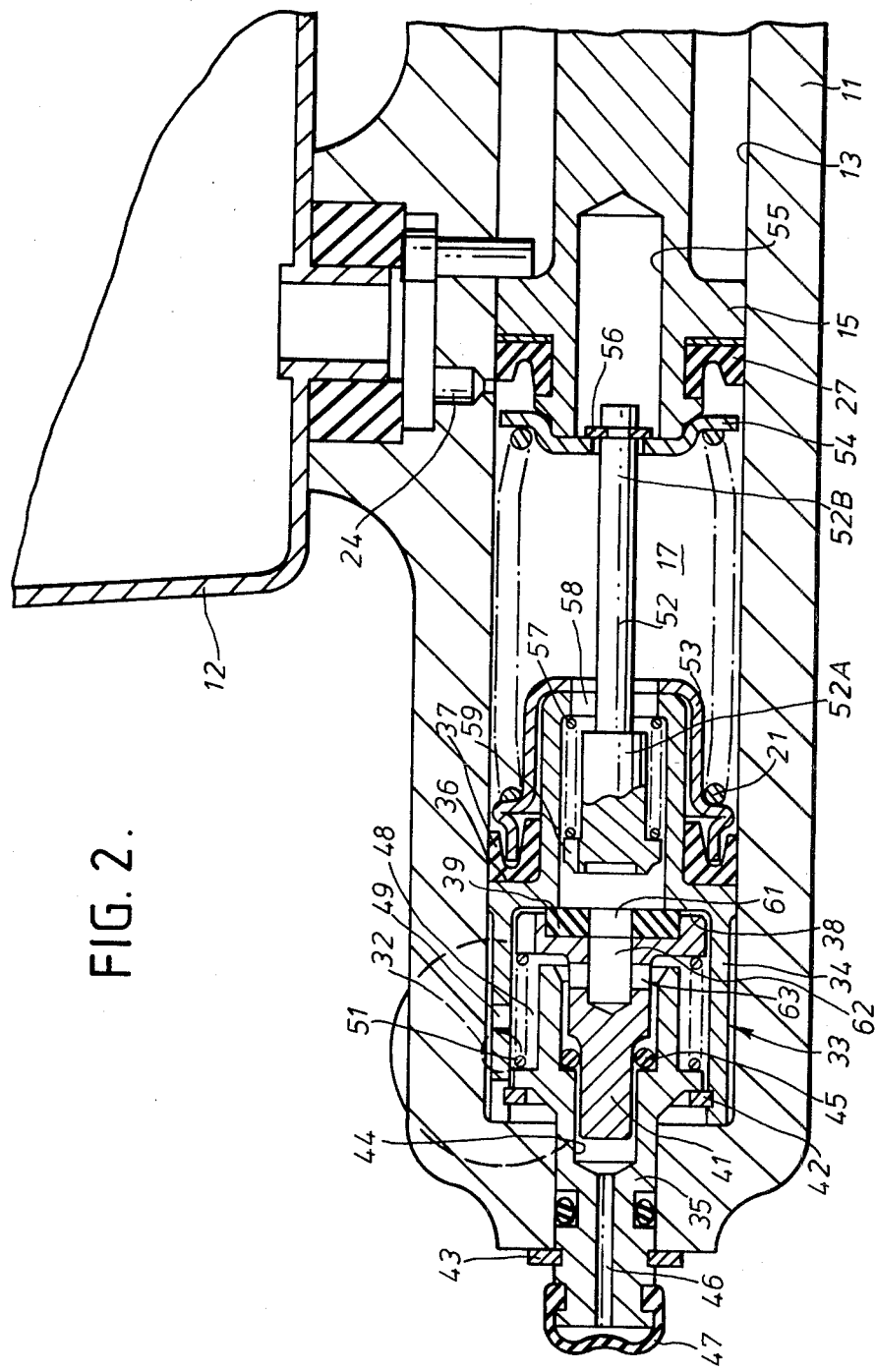

HYDRAULIC MASTER CYLINDER

The invention relates to hydraulic master cylinders for motor vehicle split braking systems of the kind in which disc brakes act on one set of wheels and drum brakes act on another set of wheels. In such braking systems it is sometimes desirable to prevent initial operation of the disc brakes until there is sufficient pressure in the drum brakes to overcome the effect of the usual brake shoe pull-off springs so that both sets of brakes start to work effectively at the same time.

Valves known as hold-off or delay valves for performing such a function are known, for example from U.S. Pat. No. 3,278,241, but these are additional items in the braking system so are necessarily an additional expense. It has been proposed in U.S. patent application Ser. No. 914,042 to provide a master cylinder which produces the same characteristics as a conventional master cylinder and the known type of delay valve. However, such master cylinders have proved to be difficult to bleed free of air so do not easily provide the required characteristics. It is thus an object of the present invention to provide an improved hydraulic master cylinder for a split braking system of the kind described which in use will delay initial operation of the disc brakes until the drum brakes start to work effectively.

The invention provides a master cylinder for use in a motor vehicle split hydraulic braking system having disc brakes for acting on one set of wheels and drum brakes for acting on another set of wheels, the master cylinder comprising a first chamber for connection to the drum brakes and which in use is pressurised by a first piston, a second chamber for connection to the disc brakes and which in use is pressurised by a second piston, delay valve means to control flow from the second chamber to the disc brakes, said delay valve means comprising a valve member operably connected to one of said first and second pistons such that the valve member moves to close communication from the second chamber to the disc brakes during initial movement of said one piston away from the brakes-released position and a plunger movable by the fluid pressure in the second chamber against a control spring to re-open communication from the second chamber to the disc brakes when pressure in the second chamber reaches a predetermined magnitude, and non-return valve means to allow flow from the disc brakes to the second chamber.

Preferably the plunger has one, relatively large, piston area subject to pressure in the second chamber by which the plunger is movable against the control spring load to open communication from the second chamber to the disc brakes and another, relatively small, piston area subject to pressure supplied to the disc brakes by which the plunger is returned to close communication from the second chamber to the disc brakes, the arrangement being such that with increasing pressure in the second chamber from said predetermined magnitude the plunger shuttles to and fro to progressively increase the pressure supplied to the disc brakes at a faster rate than the increase in pressure in the second chamber until the pressure supplied to the disc brakes is equal to the pressure in the second chamber.

One embodiment of the invention will now be described by way of example and with reference to the accompanying drawings, of which:

FIG. 1 is a cross-sectional view of a tandem hydraulic master cylinder according to the invention; and FIG. 2 is a view showing part of the section of FIG. 1 drawn to a larger scale.

Referring to the drawings, the master cylinder has a body 11 on which is mounted a brake fluid reservoir 12. The body 11 has a straight bore 13 in a first portion of which is slidable a first, or primary, piston 14 and in a second portion of which is slidable a second, or secondary, piston 15. These pistons 14 and 15 are arranged in the conventional manner of a tandem master cylinder to define a first, or primary, chamber 16 between the primary and secondary pistons 14 and 15 and a second, or secondary chamber 17 between the secondary piston 15 and the closed end of bore 13. A preloaded return spring 18 in the primary chamber 16 returns the primary piston 14 to its brakes-released position against a circlip 19 and a spring 21 in the secondary chamber 17 returns the secondary piston 15 to its brakes-released position against the preloaded spring 18. A stop pin 22 is also provided for the secondary piston 15.

The master cylinder has the usual recuperation ports 23 and 24 in the body 11, port 23 providing communication between the primary chamber 16 and the reservoir 12 when the primary piston 14 is in its brakes released position and port 24 providing communication between the secondary chamber 17 and the reservoir 12 when the secondary piston 15 is in its brakes released position. The primary piston 14 has conventional annular cup seals 25 and 26 and the secondary piston 15 is similarly fitted with seals 27 and 28.

The primary piston 14 has a recess 29 for a pushrod for connection to a driver's brake pedal, either directly or through a servo. A first outlet port 31 in the body 11 opens into the primary chamber and is for connection to the drum brakes of the vehicle.

A second outlet port 32 is for connection to the disc brakes of the vehicle. This port 32 opens into the bore 13 near the closed end but the flow of brake fluid between this port and the secondary chamber 17 is controlled by delay valve means comprising a valve assembly 33 fitted into the bore 13. The valve assembly 33 includes a housing in two parts 34 and 35. Part 34 is in the form of a hollow spool stepped externally and internally. The outer step 36 provides an abutment for an annular cup seal 37 and the inner step 38 provides a seat for a washer 39 carried by a plunger 41. The other housing part 35 is received in the part 34 and secured by a circlip 42 and is also received in a hole in the closed end of the housing 11 being secured by a circlip 43.

Plunger 41 is a sliding fit in bore 44 in part 35 and is sealed by a rubber O ring seal 45. One end of bore 44 is vented through a passage 46 covered by a rubber dust cap 47; the other end opens into an annular chamber 48 which communicates through a radial passage 49 in part 34 with the second outlet port 32. A control spring 51 in the annular chamber 48 biasses the plunger 41 away from the closed end of the master cylinder bore 13 to seat washer 39.

A valve member in the form of the head 52A of a pin 52 is slidable in housing part 34, the shank 52B of the pin 52 extending through a cup washer 53 into the secondary chamber 17 and through another cup washer 54 into a blind recess 55 in the secondary piston 15. Cup washers 53 and 54 serve as seats for spring 21, the rim of cup washer 53 also serving to retain seal 37 in position and cup washer 54 also providing an abutment for a circlip 56 located in a groove in the shank 52A. A light compression spring 57 acts between the head 52A and the housing part 34 to urge the pin 52 towards the closed end of the master cylinder bore 13.

With the parts of the master cylinder in the positions as shown in the drawings there is free communication between the secondary chamber 17 and outlet port 32 via slots 58 in the end wall of valve housing part 34, slot 59 in the head 52A, a hole 61 in washer 39, axial drilling 62 and radial passages 63 in the valve plunger 41, chamber 48, and radial passage 49. This is the normal "brakes-released" condition.

Initial movement of the primary piston 14 in the brake-applying direction towards the closed end of bore 13 causes the secondary piston 15 to move with it, driven by the preload of spring 18 which is greater than that of spring 21, so that seal 27 wipes over recuperation port 24 at approximately the same time as seal 25 wipes over recuperation port 23. Pressure is thus generated in the secondary chamber 17 providing a resistance to further movement of the secondary piston 15 in the brake-applying direction towards the closed end of bore 13 and thus allowing the primary piston 14 to move in the brake applying direction towards the secondary piston 15 to generate pressure in the primary chamber 16.

The pin 52 follows initial movement of the secondary piston 15, being moved towards plunger 41 by spring 57. When the secondary piston 15 has moved a short distance further than that needed for seal 27 to close recuperation port 24 to flow from the secondary chamber 17 the head 52A seats on washer 39 and prevents further flow from the secondary chamber to outlet port 32 through the hole 61 in washer 39 and the axial drilling 62 and radial passages 63 in the plunger 41. Thus a further effort from the pushrod on the primary piston 14 causes the pressures in the primary and secondary chambers 16 and 17 to rise but whilst the pressure supplied to the drum brakes through outlet port 31 is continued to rise, the pressure supplied to the disc brakes through outlet port 32 remains at the same low pressure that was present when the pin 52 seated on washer 39.

The pressure in the secondary chamber 17 acts on a relatively large piston area of the valve plunger 41 equivalent to the area encircled by the annular seat which washer 39 makes with step 38 to generate a force which acts against the load of spring 51. Spring 51 is assisted by the force which is generated by pressure in chamber 48 acting on a relatively small piston area equivalent to the difference between the relatively large piston area subject to secondary chamber pressure and the area defined by the inner diameter of seal 45. Hence at a predetermined magnitude of secondary chamber pressure the plunger 41 moves against spring 51 to unseat washer 39 from step 38 and allow a quantity of brake fluid from the secondary chamber 17 to the second outlet port 32. The immediate effect is to increase the pressure in chamber 48 so that the plunger 41 is returned to re-seat the washer 30 on step 38 and shut-off flow from the secondary chamber 17 to the disc brakes. Circlip 56 co-operates with washer 54 to provide a lost-motion connection between the pin 52 and the secondary piston 15.

As pressure in the secondary chamber 17 continues to rise the valve plunger 41 shuttles to and fro, opening and closing communication from the secondary chamber 17 to the disc brakes with pressure at the second outlet port 32 rising at a higher rate than secondary chamber pressure until becoming equal to secondary chamber pressure. The plunger 41 then remains in the open position until the brakes are released by the driver removing the pushrod effort on the primary piston 15. The plunger 41 moves under the load of spring 51 to reseat washer 39 on step 38 at the same pressure that the pressure at the second outlet port 32 became equal to the secondary chamber pressure but pressure at the outlet port 32 continues to fall at the same rate as secondary chamber pressure since seal 37 acts as a non-return valve providing a direct path for fluid from the disc brakes to the secondary chamber 17.

A master cylinder according to the invention may take alternative forms. For example the valve assembly 33 may be part of a secondary piston in a tandem master cylinder and control the supply of fluid from the primary chamber to the disc brakes, the pin 52 being operably connected to the primary piston. Alternatively the valve assembly may be outside the main bore of the master cylinder, pin 52 being replaced by a tilt valve which can seat in response to brake-applying movement of either the primary piston or the secondary piston. The master cylinder may be of the twin-bore type with the first and second pistons each movable in a respective one of twin parallel bores by a load apportioning mechanism by which both pistons can be connected to the driver's foot pedal.

We claim:

1. A master cylinder for use in a motor vehicle split hydraulic braking system having disc brakes for acting on one set of wheels and drum brakes for acting on another set of wheels, the master cylinder comprising:
   a body having first and second bore portions therein;
   a first piston slidable in the first bore portion;
   a second piston slidable in the second bore portion;
   a first chamber defined by the housing and the first piston, and which in use is pressurised by movement of the first piston in a brake-applying direction;
   a second chamber defined by the housing and the second piston and which in use is pressurised by movement of the second piston in a brake-applying direction;
   a first outlet port communicating with the first chamber for connection to the drum brakes;
   a second outlet port communicating with the second chamber for connection to the disc brakes;
   delay valve means to control flow from the second chamber to the second outlet port, said delay valve means comprising a valve member mechanically connected to one of said first and second pistons and being movable to close communication from the second chamber to the second outlet port in direct response to initial movement of said one piston away from a brake released position, a plunger movable by fluid pressure in the second chamber to re-open communication from the second chamber to the second outlet port and a control spring biassing the plunger in the opposite direction to delay such movement of the plunger until pressure in the second chamber reaches a predetermined magnitude;
   and non-return valve means allowing return flow from the second port to the second chamber.

2. The master cylinder of claim 1 further comprising a valve seat on the plunger, the valve seat encircles a port which is closed by the valve member to close communication from the second chamber to the second outlet port.

3. The master cylinder of claim 2 further comprising a lost-motion connection between the valve member and said one piston and a spring biassing the valve member towards said valve seat.

4. A master cylinder according to any one of claims 1 to 3 further comprising a housing in which the plunger is slidable, the housing, plunger and control spring together forming at least part of a valve assembly which is fitted into the end of said second bore portion.

5. A master cylinder according to claim 4, wherein the valve assembly further includes the valve member.

6. A master cylinder according to claim 4, wherein the second outlet port is sealed from the second chamber by an annular cup seal which is encircled by the housing and acts as said non-return valve means.

7. A master cylinder according to claim 4, wherein the master cylinder is a tandem master cylinder, the first piston being the primary piston and the second piston being the secondary piston.

8. A master cylinder according to claim 4, wherein the plunger has one, relatively large, piston area subject to pressure in the second chamber by which the plunger is movable against the control spring load to open communication from the second chamber to the second outlet port and another, relatively small, piston area subject to pressure at the second outlet port by which the plunger is returned to close communication from the second chamber to the second outlet port such that with pressure in the second chamber increasing from said predetermined magnitude the plunger shuttles to and fro to progressively increase the pressure at the second outlet port at a faster rate than the increase in pressure in the second chamber until the pressure at the second outlet port is equal to the pressure in the second chamber.

* * * * *